United States Patent
Ejiri

(10) Patent No.: US 11,719,946 B2
(45) Date of Patent: Aug. 8, 2023

(54) EYEGLASS FRAME FOR HEAD MOUNTED DISPLAY

(71) Applicant: diVRse CO., LTD., Tokyo (JP)

(72) Inventor: Masashi Ejiri, Tokyo (JP)

(73) Assignee: diVRse Co., Ltd., Tokyo (JP)

( * ) Notice: Subject to any disclaimer, the term of this patent is extended or adjusted under 35 U.S.C. 154(b) by 0 days.

(21) Appl. No.: 17/913,561

(22) PCT Filed: Mar. 28, 2020

(86) PCT No.: PCT/JP2020/014419
§ 371 (c)(1),
(2) Date: Sep. 22, 2022

(87) PCT Pub. No.: WO2021/199097
PCT Pub. Date: Oct. 7, 2021

(65) Prior Publication Data
US 2023/0107957 A1 Apr. 6, 2023

(51) Int. Cl.
*G02C 9/00* (2006.01)
*G02B 27/01* (2006.01)

(52) U.S. Cl.
CPC ........... *G02B 27/0176* (2013.01); *G02C 9/00* (2013.01)

(58) Field of Classification Search
CPC .............................. G02B 27/0176; G02C 9/00
USPC .................................................... 351/41, 155
See application file for complete search history.

(56) References Cited

U.S. PATENT DOCUMENTS

| 10,261,324 B2 * | 4/2019 | Chuang .............. G02B 27/0025 |
| 10,788,686 B2 * | 9/2020 | Tsai .......................... G02C 7/10 |
| 11,340,464 B2 * | 5/2022 | Kamakura ............. G02C 5/001 |

FOREIGN PATENT DOCUMENTS

| JP | S60-94217 U | 6/1985 |
| JP | S63-184065 U | 11/1988 |
| JP | 2005-275051 A | 10/2005 |
| JP | 2019-537287 A | 12/2019 |

OTHER PUBLICATIONS

WIPO, International Search Report for International Application No. PCT/JP2020/014419, dated Jun. 30, 2020.
WIPO, Written Opinion for International Application No. PCT/JP2020/014419, dated Jun. 30, 2020.
Japan Patent Office, Office Action for Japanese Patent Application No. 2020-540842, dated Oct. 13, 2020.

* cited by examiner

*Primary Examiner* — Tuyen Tra

(57) ABSTRACT

An eyeglass frame 12 for a head mounted display 10 comprises a lens supporting member 28a, 28b that supports eyeglasses 26a, 26b and is mounted on a mount portion 16 of the head mounted display 10; and plurality of engaging portions 38a~38d, 42a~42d, 44a,44b, 48a, 48b that are formed on positions corresponding to various shapes of the mount portion 16 on outer circumferential portion of the lens supporting member 28a, 28b and engage with an internal wall surface 36 of the mount portion 16, wherein the engaging portions 38a~38d include elastic members slidable along the internal wall surface.

8 Claims, 3 Drawing Sheets

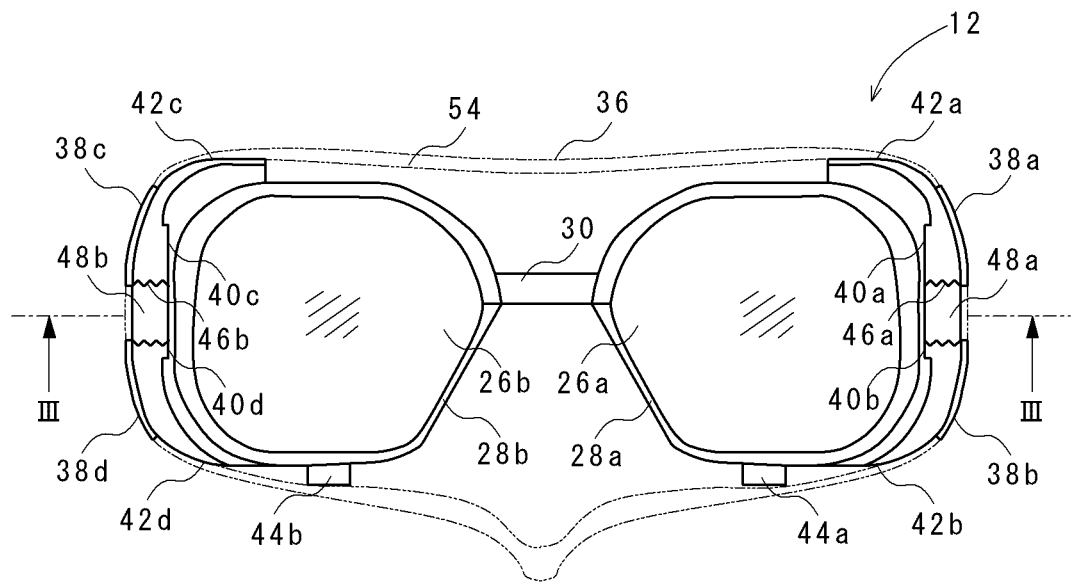
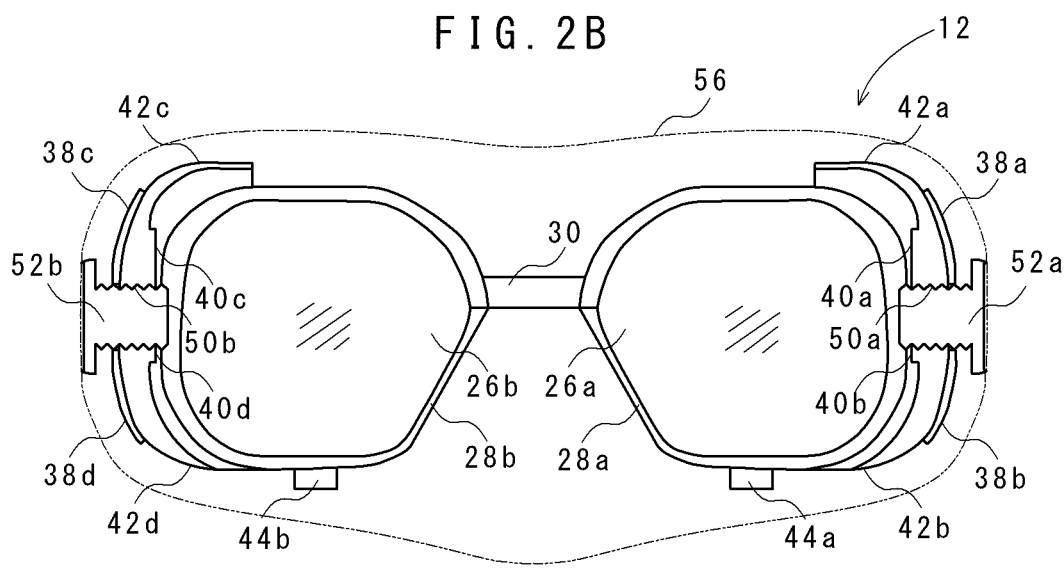

EYEGLASS FRAME FOR HEAD MOUNTED DISPLAY

FIELD OF THE INVENTION

The present invention is related to an eyeglass frame for a head mounted display, which supports eyeglass lenses and is mounted on a mount portion of the head mounted display.

BACKGROUND OF THE ART

Generally, a head mounted display (HMD) is a device that is mounted on a user's head to provide the user with spatial and temporal experience similar to reality as a video image of virtual reality (VR).

As disclosed in Patent Document 1, a head mounted display includes a body in a goggle-like shape, which is mounted on a user's head by way of a mount portion. The body is provided with a display portion for displaying a video image of virtual reality. The video image of the virtual reality to be displayed on the display portion is generated by a computer installed in the body or an external computer connected to the body.

BACKGROUND OF THE ART

Patent Document 1: JP 2019-537287 A

DISCLOSURE OF THE INVENTION

Problems the Invention is Intended to Solve

In some cases, a user who mounts a head mounted display uses eyeglasses for dairy life. The eyeglasses used by the user may have various sizes and shapes, and include temples to allow the eyeglasses to be mounted on the user's face. On the other hand, shapes of mount portions of head mounted displays are different from each other per manufactures.

Based on the above, when the user uses a head mounted display while wearing the user's eyeglasses, temples of the eyeglasses may interfere with side walls of the mount portion, and therefore the user could not mount the head mounted display smoothly. Further, since the temples of the eyeglasses are pushed onto temporal regions of the user's head by the side walls or the like of the mount portion, the user may feel uncomfortable when using the head mounted display for a long time. Furthermore, in some cases, the display portion is constructed such that its position can be adjusted backward and forward in order to secure optimal view angle. The eyeglasses are however fixedly mounted on the user's face, and therefore the display portion may collide with the eyeglasses when the display portion is being moved. In such a case, adjustable range of the position of the display portion is limited and the user may not secure the view angle enough.

The present invention has been made for solving the above problems, and an object of the present invention is to provide an eyeglass frame for a head mounted display, which can avoid stress on temporal regions of the head of a user who wears eyeglasses, allow comfortable use of the head mounted display for a long time and permit the user to view a video image in the optimal state, while various shapes of a mount portion of the head mounted display can be applied.

SUMMARY OF THE INVENTION

In accordance with an aspect of the present invention, an eyeglass frame for a head mounted display comprises a lens supporting member that supports eyeglasses and is mounted on a mount portion of the head mounted display; and plurality of engaging portions that are formed on positions corresponding to various shapes of the mount portion on outer circumferential portion of the lens supporting member and engage with an internal wall surface of the mount portion, wherein the engaging portions include elastic members slidable along the internal wall surface.

In the eyeglass frame for a head mounted display, the elastic members are made from synthetic rubber having 31-35 degree of hardness (Type A).

In the eyeglass frame for a head mounted display, the engaging portions are provided with engaging members whose mounted positions can be adjusted relative to the lens supporting member, and the engaging members are detachable to the lens supporting member.

In the eyeglass frame for a head mounted display, the lens supporting member includes a projection portion for removing the lens supporting member from the mount portion.

Effects of the Invention

In an eyeglass frame for a head mounted display according to the present invention, lens supporting members that support eyeglasses are mounted on a mount portion and engaging portions formed on outer circumferential portions of the lens supporting members engage with an internal wall surface of the mount portion, and therefore a user can view an adequate video image of virtual reality in accordance with the user's ability to see. Further, since the lens supporting members do not include any temples, the temporal regions of the user's head will not be pressed by the mount portion and therefore the user can use the head mounted display comfortably for a long time. Further, since the engaging portions are formed on plural positions corresponding to various shapes of the mount portion, the eyeglass frame can be used for head mounted displays with mount portions having different shapes. Furthermore, since the eyeglass frame can be slid to adjust its position relative to the mount portion by way of elastic members as the engaging portions, the user can secure wide view angle and see the video image in the optimal state.

BRIEF DESCRIPTION OF THE DRAWINGS

FIG. 2A shows a top view of the eyeglass frame according to the embodiment and FIG. 2B shows a top view of an eyeglass frame according to another embodiment of the present invention.

DESCRIPTION OF THE PREFERRED EMBODIMENTS

Figure 1:
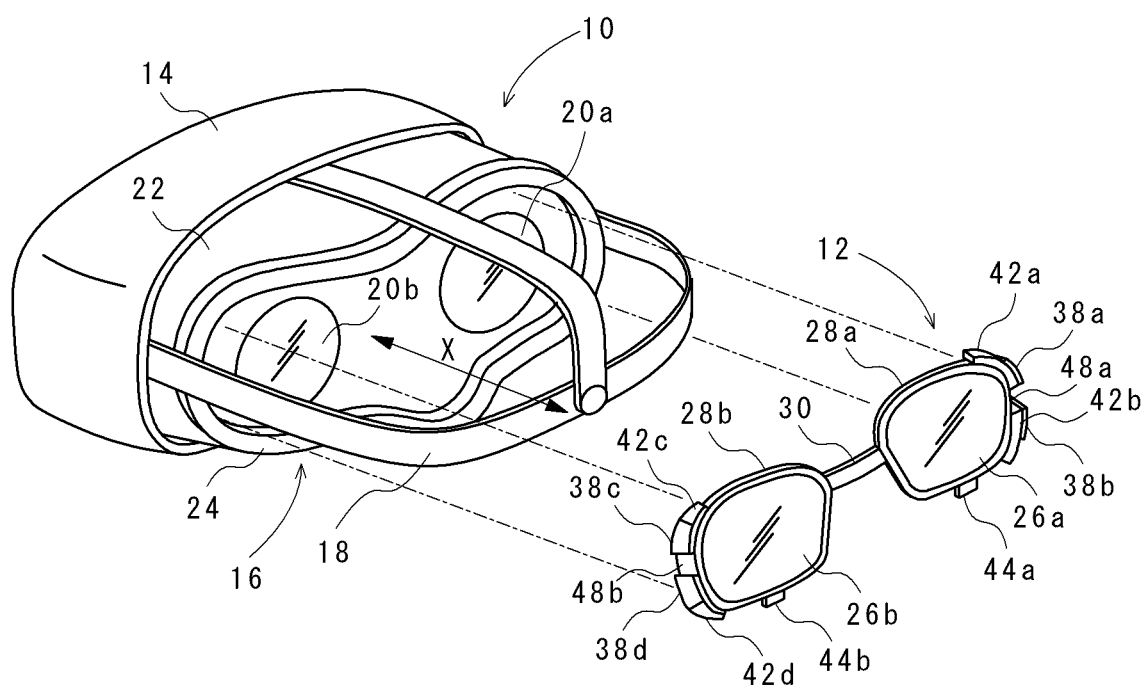
FIG. 1 shows a perspective view presenting relation between a head mounted display and an eyeglass frame according to an embodiment of the present invention.

An eyeglass frame for a head mounted display according to an embodiment of the present invention will be described below with reference to the accompanying drawings. FIG. 1 shows a perspective view presenting relation between a head mounted display 10 and an eyeglass frame 12 according to an embodiment of the present invention. FIG. 2A shows a top view of the eyeglass frame according to the embodiment.

The head mounted display 10 includes a body 14, a mount portion 16 and a belt 18.

The body 14 installs a computer for generating a video image of virtual reality. The body 14 includes left and right display portions 20a, 20b for displaying a video image of virtual reality. The mount portion 16 includes a housing 22 and a cushion portion 24. The belt 18 is used to fix the head mounted display 10 to a user's head. Further, each end of the belt 18 is fixed to the body 14. The display portions 20a, 20b can be moved relative to the housing 22 in the direction of an arrow X such that the distance between the display portions 20a, 20b and the user's eyes can be adjusted to secure a wide view angle. The housing 22 has a tubular shape surrounding the display portions 20a, 20b. The cushion portion 24 is provided on the peripheral border of an opening of the housing 22 and contacts the user's face. The cushion portion 24 is made from sponge or leather, for example.

Figure 3:
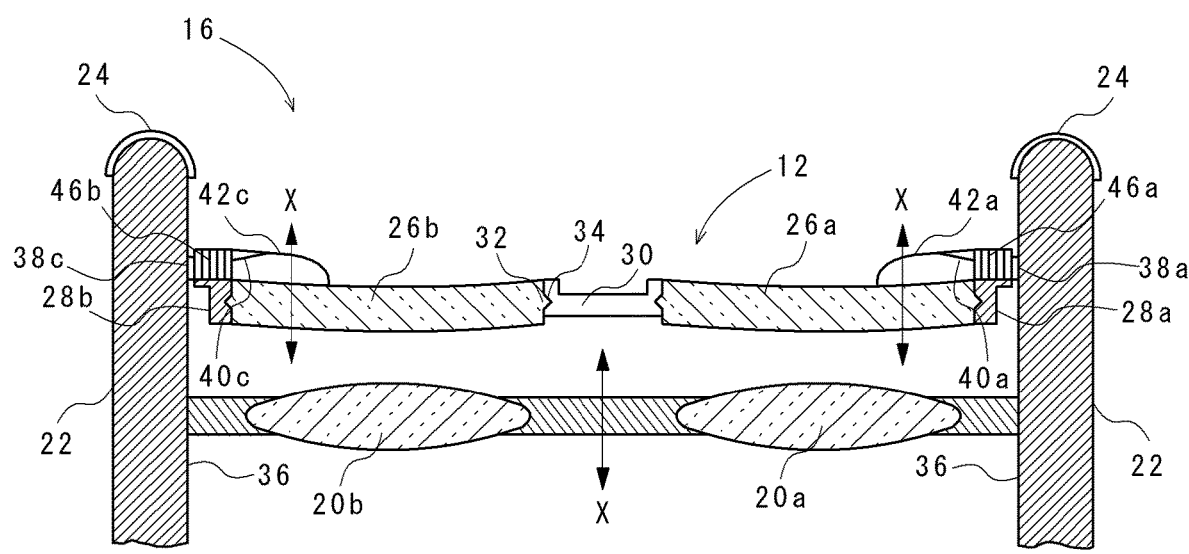
FIG. 3 shows a cross-sectional view along with lines III-III in FIG. 2A.

As shown in FIG. 2A, the eyeglass frame 12 includes lens support members 28a, 28b for supporting outer circumferential portions of eyeglasses 26a, 26b corresponding to the ability to see of the user's eyes. The lens supporting members 28a, 28b are connected to each other by a temple member 30. As shown in FIG. 3, concave portions 34 engaging with convex portions 32 are formed on inner circumferential portions of the lens support members 28a, 28b. The convex portions 32 are formed on outer circumferential portions of the eyeglasses 26a, 26b.

Engaging portions 38a-38d are formed on left and right side portions of the outer circumferential portions of the lens supporting members 28a, 28b. The engaging portions 38a-38d engage with an inner wall surface 36 of the housing 22 that constitutes the mount portion 16. In such an arrangement, as shown in FIG. 3, the engaging portions 38a-38d are formed by elastic members that can be slid in the direction of the arrow X along the inner wall surface 36 of the housing 22. The elastic members are made from, for example, synthetic rubber having 31-35 degree of hardness (Type A). Projection portions 40a-40d are formed near the engaging portion 38a-38d of the lens supporting members 28a, 28b. The projection portions 40a-40d are used to remove the eyeglass frame 12 from the mount portion 16 by the user's fingertips.

Further, engaging portions 42a-42d engaging with the inner wall surface 36 of the housing 22 are formed on upper and lower portions relative to the engaging portions 38a-38d of the outer circumferential portions of the lens supporting members 28a, 28b. Further, engaging portions 44a, 44b engaging with the inner wall surface 36 of the housing 22 are formed on lower portions relative to the outer circumferential portions of the lens supporting members 28a, 28b.

Furthermore, engaging portions 48a, 48b having teeth-shaped step portions 46a, 46b are formed between the engaging portions 38a, 38b and between the engaging portions 38c, 38d. FIG. 2B shows a top view of an eyeglass frame according to another embodiment of the present invention. As shown in FIG. 2B, engaging members 52a, 52b having teeth-shaped step portions 50a, 50b corresponding to the step portions 46a, 46b can be mounted on the engaging portions 48a, 48b. Provided positions of the engaging members 52a, 52b can be adjusted relative to the lens supporting members 28a, 28b. Further, the engaging members 52a, 52b can be detachable relative to the lens supporting members 28a, 28b.

It is noted that the engaging portions 38a-38d are used to make the mount portion 16 of the head mounted display 10 support the lens supporting members 28a, 28b. On the other hand, the engaging portions 42a-42d, the engaging portions 44a, 44b, the engaging portions 48a, 48b and the engaging members 52a, 52b are used to support the eyeglass frame 12 relative to another head mounted display with a mount portion 16 having different shape.

The head mounted display 10 and the eyeglass frame 12 according to the present embodiment are basically constructed as mentioned above. Next, a method of mounting the eyeglass frame 12 to the head mounted display 10 and a method of using the same will be described below.

First, a case where the eyeglass frame 12 is mounted to the mount portion 16 of the head mounted display 10 by way of the engaging portion 38a-38d will be explained.

As shown in FIG. 2A, the eyeglass frame 12 is positioned within the housing 22 of the mount portion 16. In doing so, the engaging portions 38a-38d formed on both sides of the lens supporting members 28a, 28b engage with the internal wall surface 36 of the housing 22, as shown in FIG. 3. Then, as shown in FIG. 1, in the head mounted display 10, the positions of the display portion 20a, 20b can be moved in the direction of the arrow X to adjust the view angle. So, the user moves the display portions 20a, 20b in the direction of the arrow X, and moves the eyeglass frame 12 along the internal wall surface 36 of the housing 22 in the direction of the arrow X, thereby adjusting the positional relation between the display portions 20a, 20b and the eyeglass frame 12. In this case, since the engaging portions 38a-38d are constituted of the elastic members made from the synthetic rubber having 31-35 degree of hardness (Type A), the user can slide the eyeglass frame 12 to the position where the frame 12 does not interfere with the display portions 20a, 20b to secure a wide view angle.

After mounting the eyeglass frame 12 to the head mounted display 10 as described above, the user can mount the head mounted display 10 to the user's head by way of the belt 18 and enjoy the video image. In this case, since the eyeglass frame 12 has no temple portion that usual glasses have, the temporal regions of the user's head will not be stressed and therefore the user can use the head mounted display 10 comfortably for a long time. Further, since the distance between the eyeglass lenses 26a, 26b supported by the eyeglass frame 12 and the display portions 20a, 20b is adjusted to the optimal position, the user can secure the wide view angle and view the video image in the optimal state.

Further, the user can mount the eyeglass frame 12 to another head mounted display 10 with a mount portion 16 having the different shape by way of the engaging portions 42a-42d and the engaging portions 44a, 44b. The shape of an internal wall surface 54 of the other mount portion 16 is shown as the chain double-dashed line in FIG. 2A.

Similarly to the above method, the eyeglass frame 12 is mounted along the internal wall surface 54 of the housing 22 shown as the chain double-dashed line in FIG. 2A. In this case, by engaging the engaging portions 42a-42d and the engaging portions 44a, 44b with the internal wall surface 54, the eyeglass frame 12 is fixed to the internal wall surface 54.

Further, as shown in FIG. 2B, the user can mount the eyeglass frame 12 to the other head mounted display 10 with the mount portion 16 having the different shape by way of the engaging members 52a, 52b. The shape of the internal wall surface 56 of the mount portion 16 is shown as the chain double-dashed line in FIG. 2B.

As shown in FIG. 2B, the engaging members 52a, 52b engage with certain positions of the engaging portions 48a, 48b of the eyeglass frame 12. Then, the eyeglass frame 12 engaged with the engaging members 52a, 52b is mounted along the internal wall surface 56 shown as the chain double-dashed line in FIG. 2B. In this case, by engaging the engaging members 52a, 52b set by the engaging positions between the step portions 46*a*, 46*b* and the step portions 50*a*, 50*b* with the internal wall surface 56, the eyeglass frame 12 is fixed to the internal wall surface 54. It is noted that the user can adjust the positions of the engaging members 52*a*, 52*b* and then mount the eyeglass frame 12 to yet another head mounted display 10 with a mount portion 16 having yet another shape.

On the other hand, the user can use the projection portions 40*a*-40*b* formed on both sides of the lens supporting members 28*a*, 28*b* to easily remove the eyeglass frame 12 mounted on the head mounted display 10 from the mount portion 16. That is, the user can easily remove the eyeglass frame 12 by engaging the user's fingertips with the projection portions 40*a*-40*d* and drawing the frame 12 from the mount portion 16.

It is noted that the present invention is not limited to the above-described embodiments, but the scope of the present invention includes other embodiments that do not depart from the gist of the present invention.

For example, the eyeglass frame 12 can be applied to another type of a head mounted display in which the display portions 20*a*, 20 are fixed and do not move in the direction of the arrow X. Further, the engaging portions 42*a*, 42*b*, the engaging portions 44*a*, 44*b* and the engaging members 52*a*, 52*b* formed on the outer circumferential portions of the eyeglass frame 12 can be made from the elastic members and slid along the internal wall surface 36 of the housing 22, similarly to the engaging portions 38*a*-38*d*.

KEY TO SYMBOL

10: head mounted display
12: eyeglass frame
14: body
16: mount portion
18: belt
20*a*, 20*b*: display portion
22: housing
24: cushion portion
26*a*, 26*b*: eyeglasses
28*a*, 28*b*: lens supporting member
30: temple member
32: convex portion
34: concave portion
36, 52, 54: inner wall surface
38*a*~38*d*, 42*a*~42*d*, 44*a*, 44*b*, 48*a*, 48*b*: engaging portion
40*a*~40*d*: projection portion
46*a*, 64*b*, 50*a*, 50*b*: step portion
52*a*, 52*b*: engaging member

The invention claimed is:

1. An eyeglass frame for a head mounted display, comprising:
   a lens supporting member that supports eyeglasses and is positioned and mounted in a mount portion of the head mounted display; and
   plurality of engaging portions that are formed on positions corresponding to various shapes of the mount portion on outer circumferential portion of the lens supporting member and engage with an internal wall surface of the mount portion,
   wherein the engaging portions include elastic members slidable along the internal wall surface, and
   the lens supporting member is mounted on the mount portion by way of the engaging portions including the elastic members.

2. The eyeglass frame for the head mounted display according to claim 1,
   wherein the elastic members are made from synthetic rubber having 31-35 degree of hardness (Type A).

3. The eyeglass frame for the head mounted display according to claim 2,
   wherein
   the engaging portions are provided with engaging members whose mounted positions can be adjusted relative to the lens supporting member, and the engaging members are detachable to the lens supporting member the engaging portions are provided with engaging members whose mounted positions can be adjusted relative to the lens supporting member, and the engaging members are detachable to the lens supporting member.

4. The eyeglass frame for the head mounted display according to claim 3,
   wherein the lens supporting member includes a projection portion for removing the lens supporting member from the mount portion.

5. The eyeglass frame for the head mounted display according to claim 2,
   wherein the lens supporting member includes a projection portion for removing the lens supporting member from the mount portion.

6. The eyeglass frame for the head mounted display according to claim 1,
   wherein the engaging portions are provided with engaging members whose mounted positions can be adjusted relative to the lens supporting member, and the engaging members are detachable to the lens supporting member.

7. The eyeglass frame for the head mounted display according to claim 6,
   wherein the lens supporting member includes a projection portion for removing the lens supporting member from the mount portion.

8. The eyeglass frame for the head mounted display according to claim 1,
   wherein the lens supporting member includes a projection portion for removing the lens supporting member from the mount portion.

\* \* \* \* \*